Figure 2:
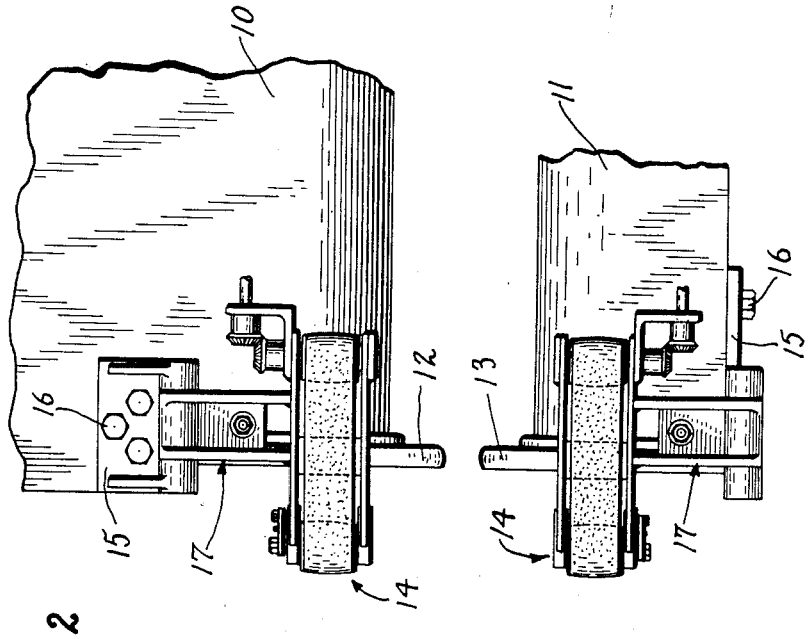

Jan. 12, 1954  J. F. DEFFENBAUGH  2,665,530
MAINTENANCE DEVICE

Filed Sept. 14, 1951                      2 Sheets-Sheet 1

INVENTOR.
JAMES F. DEFFENBAUGH
BY
ATTORNEY

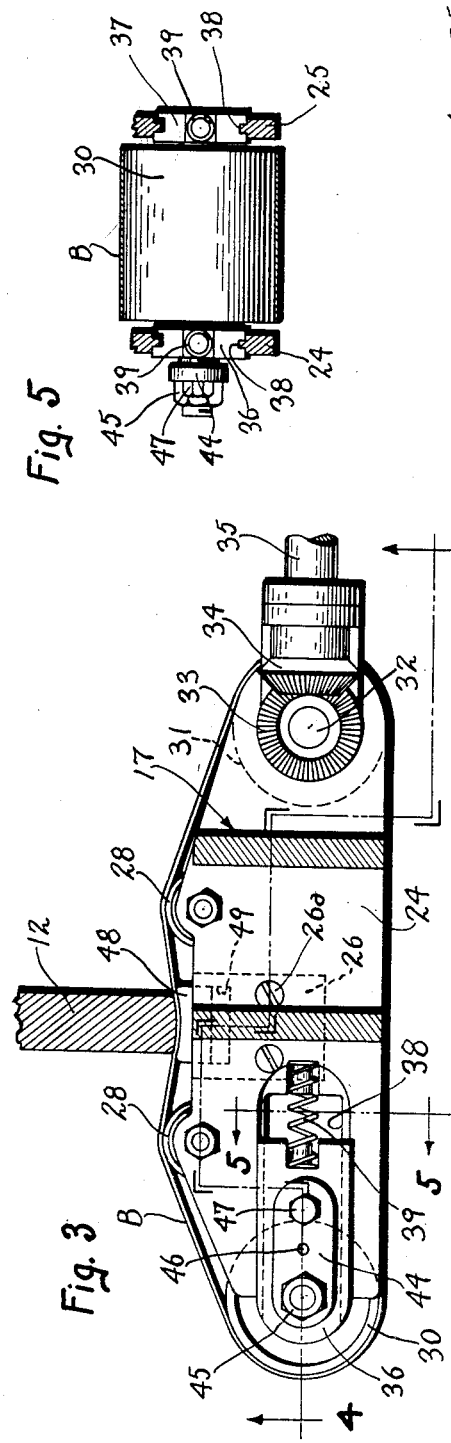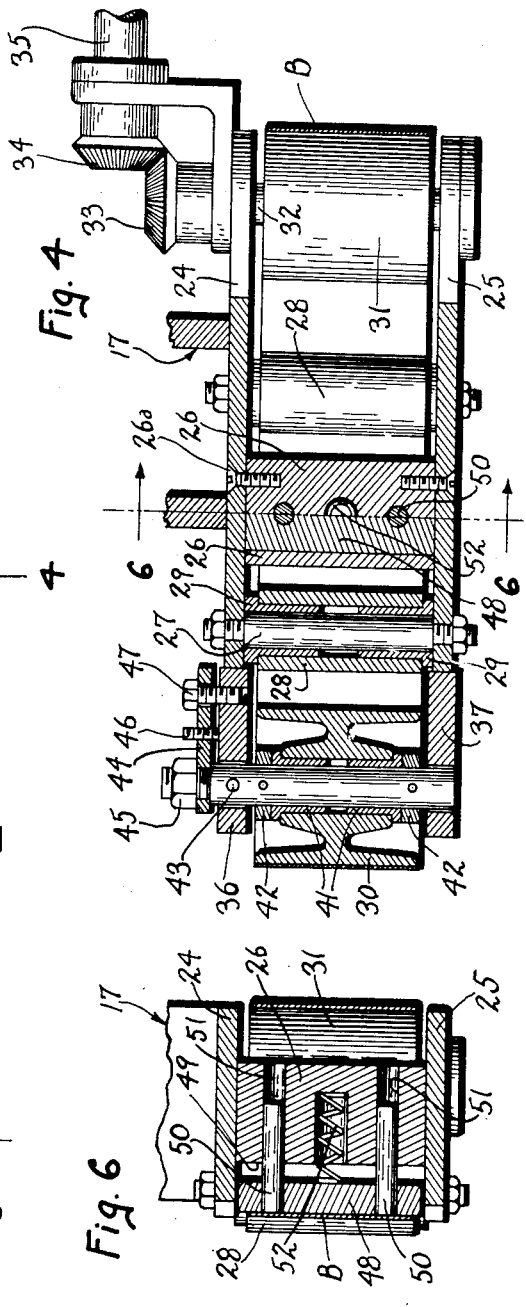

Patented Jan. 12, 1954

2,665,530

UNITED STATES PATENT OFFICE 2,665,530

MAINTENANCE DEVICE

James F. Deffenbaugh, Warren, Ohio, assignor to The Federal Machine and Welder Co., Warren, Ohio, a corporation of Ohio Application September 14, 1951, Serial No. 246,665

3 Claims. (Cl. 51—241)

My invention relates to maintenance devices, more particularly to devices used to trim and maintain the desired peripheral profile of seam welding wheels, and the principal object of my invention is to produce new and improved devices of the character described.

In seam welding it is necessary that the electrode wheels of the welder have their peripheries formed to a particular profile in order for the welder to produce sound welds. Unfortunately however, the extreme heat and pressure to which the wheels are subjected has a tendency to mushroom the peripheries of the wheels and deform their original, optimum profiles.

My invention is designed to quickly restore the original profile of the welding wheels with a minimum interruption of production. If desired, my improved trimming device may even be used to trim the welding wheels during the welding operation. Other advantages will become apparent from a study of the following specification and the appended drawings.

Figure 1:
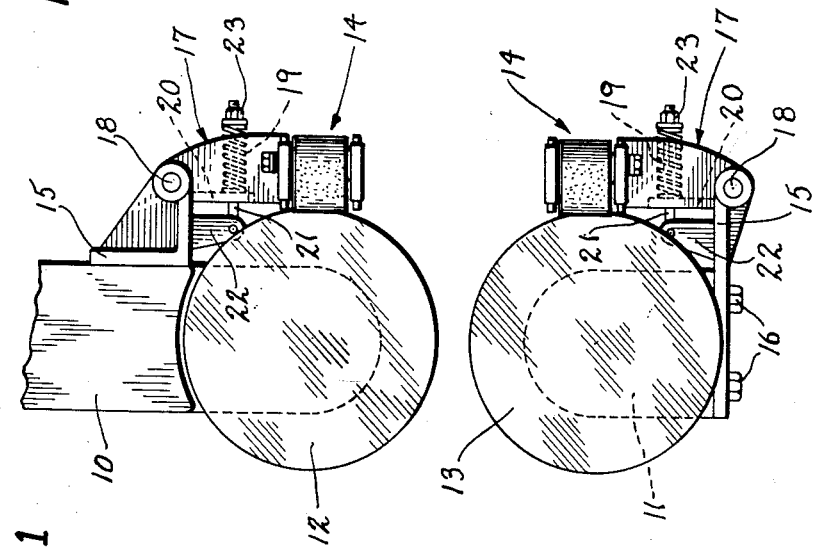

In the drawings accompanying this application and forming a part thereof, there is shown, for purpose of illustration, an embodiment which my invention may assume, and in these drawings:

Figure 1 is a front elevational view showing my invention applied to a conventional, fragmentarily shown, seam welder, Figure 2 is a fragmentary side elevational view of the mechanism shown in Figure 1, Figure 3 is an enlarged plan view of my improved trimming device, the support therefor being shown in section and a welding wheel being fragmentarily shown in section, Figure 4 is a sectional view generally corresponding to the line 4—4 of Figure 3, Figure 5 is a fragmentary sectional view generally corresponding to the line 5—5 of Figure 3, and Figure 6 is a fragmentary sectional view generally corresponding to the line 6—6 of Figure 4.

As illustrated in Figures 1 and 2, my invention may be applied to a conventional seam welder fragmentarily shown to comprise an upper arm 10 and a lower arm 11. Upper and lower welding wheels 12 and 13, respectively, are rotatably carried by respective arms in the conventional manner. A trimming device 14 which constitutes my invention is herein shown applied to each welding wheel so that trimming of one wheel may be effected independently of the other.

Each device 14 is pivotally secured to its respective arm by means of a support 17, a pivot 18, and brackets 15 which are secured to respective arms by bolts 16. The devices 14 are urged to engagement with the welding wheels by means of springs 19 which have one end thereof seated against a wall 20 of the supports 17. Eye-bolts 21 are secured to projections 22 of the brackets 15 and these bolts pass through the apertures in the walls 20 and through the centers of the springs 19. Nuts 23 may be threaded upon the bolts 21 in order to compress the springs 19 and urge the devices 14 against the welding wheels with the required force. Any desirable means may be employed to hold the devices 14 away from the welding wheels when trimming is not required.

Since the devices 14 are identical, only the upper one is shown in Figures 3, 4, 5 and 6. It will be understood, however, that the following description is equally applicable to the lower device.

With particular reference to Figures 3 and 4, the device is preferably formed of a pair of plates 24 and 25 secured together in spaced relation by means of a spacer block 26, screws 26a, and a pair of shoulder bolts 27. Bolts 27 serve as axles for respective rollers 28, friction reduction being provided by any desirable means, such as by bushings 29. Enlarged rollers 30 and 31 are also provided, and as illustrated, the roller 30 is an idler roller and roller 31 is a drive roller. An endless abrasive belt B extends around the rollers as shown.

The drive roller 31 is secured to a shaft 32 which is journaled in plates 24, 25. Secured to the shaft 32 is a miter gear 33 which is meshed with another gear 34 secured to a flexible shaft 35. The flexible shaft 35 may be driven by a conventional motor unit and therefore such drive has not been shown in the drawings.

The idler roller 30 is not supported directly by the plates 24, 25, but rather is supported by slides 36, 37 which have slidable engagement with respective plates 24, 25. As shown in Figures 3 and 5, each plate provides a rectangular opening 38 extending longitudinally from one end thereof. The opening is formed to provide a circumscribing rib, and each slide is provided with grooves which engage with the rib to form a tongue and groove construction (see Figure 5).

As will now be apparent, the slides are constrained to longitudinal movement of the plates 24, 25. A coil spring 39 is seated between each slide and its respective plate for urging the slides to the left, as seen in Figure 3, and for a purpose to be described.

As best shown in Figure 4, each slide is apertured to pass the shaft 40 of the idler roller 30. These apertures are slightly oversize so as to prevent binding of the shaft when it is tilted (this condition later to be described). The roller 30 rotates upon bushings 41 and collars 42 are pinned to the shaft 40 to prevent axial displacement of the roller. A pin 43 secures the shaft 40 to the slide 36, the shaft pivoting about this pin for a purpose to be described.

A tab 44 extends laterally from the shaft 40 and has one end secured thereto by means of a nut 45. It will be clear that as the free end of the laterally extending tab is moved toward or away from the slide 36, the shaft 40 will be caused to tilt about the pin 43. A set screw 46 and a bolt 47 are presently employed to effect movement of the tab 44 and to lock it in the desired position.

The above described tiltable feature of the shaft 40 provides an adjustment for centering the belt B on the rollers so that the belt runs true. With the floating slide construction illustrated, a difference in spring rate of the springs 39, or the occurrence of wear in the slides, would tend to cause misalignment of the shaft 40. This condition may be easily corrected by tilting the shaft 40 in the manner described heretofore.

As best shown in Figures 3, 4 and 6, a back-up block 48 is provided to support the belt B and to shape the cutting portion of the belt for properly trimming the periphery of the welding wheel. As shown in Figure 3, the spacer block 26 is cut out at 49 to provide a rectangular opening into which the back-up block 48 may slide. Secured to the back-up block and extending therefrom (see Figure 6), are two guide pins 50 which are slidable in bores 51 in the spacer block 26. A coil spring 52 is disposed between the two blocks to constantly urge the back-up block against the belt B.

The use of the trimming device may be as follows: Assuming the welding wheels are rotating, the drive mechanism (not shown) for the device may be energized. The shaft 40 may then be adjusted, if necessary, to cause the belt to run true. Either one or both of the devices may then be unlatched (latching mechanism not being shown), so that the spring 19 will shift the respective device to the position shown in Figures 1, 2 and 3 so that the moving belt will be forced against the rotating welding wheel. Thus it will be evident that the moving abrasive belt will quickly trim the periphery of the welding wheel to its original optimum profile, and such periphery will be maintained smooth and free of chip and tool marks which may result when ordinary cutting devices are used to trim the wheel.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. In a seam welder having an arm and a seam welding wheel rotatably carried by said arm, the combination of a device for trimming the periphery of said welding wheel comprising a frame including a pair of spaced-apart plates and at least two belt wheels rotatably carried by shafts extending between said plates and over which an endless abrasive belt is trained, said frame being carried by said arm for shifting movement toward and away from said welding wheel and so disposed relative to said welding wheel that said belt is adapted to abrade cross-wise of the peripheral surface of said welding wheel, each of said plates having a slideway formed thereon and said slideways being in corresponding relation, a slide moveably carried in each of said slideways and supporting therebetween one of said shafts whereby the tension of said belt may be adjusted, and a follow block carried by said frame and having a surface backing up a reach of said belt, said follow block being resiliently pressed in a direction toward said welding wheel to urge said belt reach against the periphery of said welding wheel when said frame is shifted to cooperation with said welding wheel, said block surface being contoured complementarily to the desired contour of said welding wheel for the purpose of maintaining such desired contour.

2. In a seam welder having an arm and a seam welding wheel rotatably carried by said arm, the combination of a device for trimming the periphery of said welding wheel comprising a frame including a pair of spaced-apart plates and at least two belt wheels rotatably carried by shafts extending between said plates and over which an endless abrasive belt is trained, said frame being carried by said arm for shifting movement toward and away from said welding wheel and so disposed relative to said welding wheel that said belt is adapted to abrade cross-wise of the peripheral surface of said welding wheel, each of said plates having a slideway formed thereon and said slideways being in corresponding relation, a slide moveably carried in each of said slideways and supporting therebetween one of said shafts whereby the tension of said belt may be adjusted, the connection between said one shaft and said slides providing for angular adjustment of the axis of said one shaft relative to the axis of the other shaft for the purpose of centering the belt on said belt wheels, and a follow block carried by said frame and having a surface backing up a reach of said belt, said follow block being resiliently pressed in a direction toward said welding wheel to urge said belt reach against the periphery of said welding wheel when said frame is shifted to cooperation with said welding wheel, said block surface being contoured complementarily to the desired contour of said welding wheel for the purpose of maintaining such desired contour.

3. In a seam welder having an arm and a seam welding wheel rotatably carried by said arm and having a peripheral welding surface non-rectilinear in transverse section, the combination of a device for trimming the periphery of said welding wheel and maintaining its contour comprising a frame and at least two spaced-apart belt wheels carried by said frame and over which an endless abrasive belt is trained, said frame being movably carried by said arm, first spring means for biasing said frame toward said welding wheel and for pressing a reach of said belt against the periphery of said welding wheel, one of said belt wheels being movable toward and away from the other and second spring means for urging said one belt wheel away from the other to establish a predetermined tension on said belt, a follow block movably carried by said frame and having a surface backing up said belt reach, and third spring means pressing said follow block against said belt reach, the urging force of said first spring means being greater than that of the other spring means so that said frame is urged toward said welding wheel with sufficient force to cause said welding wheel to indent said belt reach and said follow block surface being contoured complementarily with the welding surface of said welding wheel so that said belt reach is caused to follow the contour of said follow block surface.

JAMES F. DEFFENBAUGH.

References Cited in the file of this patent

UNITED STATES PATENTS

| Number | Name | Date |
|---|---|---|
| 832,889 | Wysong | Oct. 9, 1906 |
| 1,370,441 | Henderson | Mar. 1, 1921 |
| 1,415,785 | Brown | May 9, 1922 |
| 1,523,151 | Wilsbach | Jan. 13, 1925 |
| 1,826,177 | Johnson | Oct. 6, 1931 |
| 2,145,418 | Herchenrider | Jan. 31, 1939 |
| 2,199,069 | Fowler | Apr. 30, 1940 |
| 2,261,244 | Fowler | Nov. 4, 1941 |
| 2,334,960 | Roth et al. | Nov. 23, 1943 |
| 2,449,519 | Sutton | Sept. 14, 1948 |
| 2,453,972 | Clave et al. | Nov. 16, 1948 |
| 2,479,506 | Payton | Aug. 16, 1949 |
| 2,483,720 | Asbury | Oct. 4, 1949 |
| 2,507,372 | Emmons | May 9, 1950 |